(12) United States Patent
Pedlow, Jr.

(10) Patent No.: US 7,895,617 B2
(45) Date of Patent: Feb. 22, 2011

(54) CONTENT SUBSTITUTION EDITOR

(75) Inventor: Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1250 days.

(21) Appl. No.: 11/344,292

(22) Filed: Jan. 31, 2006

(65) Prior Publication Data

US 2007/0189710 A1 Aug. 16, 2007
US 2010/0322596 A9 Dec. 23, 2010

Related U.S. Application Data

(63) Continuation-in-part of application No. 11/292,256, filed on Dec. 1, 2005.

(60) Provisional application No. 60/636,504, filed on Dec. 15, 2004, provisional application No. 60/637,305, filed on Dec. 16, 2004.

(51) Int. Cl.
*H04N 7/025* (2006.01)
(52) U.S. Cl. .......................... 725/32; 386/46
(58) Field of Classification Search .................. 386/35, 386/46, 55; 707/100; 715/700, 703, 723; 725/28–31, 115, 116, 145, 146, 9–14, 32, 725/34
See application file for complete search history.

(56) References Cited

U.S. PATENT DOCUMENTS 3,852,519 A 12/1974 Court (Continued)

FOREIGN PATENT DOCUMENTS

CA 2389247 5/2001

(Continued)

OTHER PUBLICATIONS

"How Networks Work—Milennium Edition"—pp. 88-89, Que Corporation, 2000.

(Continued)

*Primary Examiner*—Thai Tran
*Assistant Examiner*—Mishawn Dunn
(74) *Attorney, Agent, or Firm*—Miller Patent Services; Jerry A. Miller (57) ABSTRACT

In accordance with certain embodiments consistent with the present invention, a method providing alternate digital audio and video content in a segment of content containing compressed primary audio and encoded primary video involves inserting blank audio in an alternate audio track between segments of alternate audio; inserting black video in an alternate video track between segments of alternate video; synchronizing the alternate audio track to a master timeline; synchronizing the alternate video track to the master timeline; compressing the alternate audio track; compressing the alternate video track; trimming the blank audio from the compressed alternate audio track; trimming the black video from the compressed alternate video track; synchronizing the trimmed compressed alternate audio to locate the trimmed compressed alternate audio temporally with the primary compressed audio; synchronizing the trimmed compressed alternate video to locate the trimmed compressed alternate video temporally with the primary encoded video; and multiplexing the trimmed compressed alternate audio and the trimmed compressed alternate video with the primary compressed audio and the primary encoded video. This abstract is not to be considered limiting, since other embodiments may deviate from the features described in this abstract.

31 Claims, 5 Drawing Sheets

U.S. PATENT DOCUMENTS

| | | |
|---|---|---|
| 4,374,399 A | 2/1983 | Ensinger |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,881,263 A | 11/1989 | Herbison et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,159,633 A | 10/1992 | Nakamura |
| 5,195,135 A * | 3/1993 | Palmer ............... 380/241 |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata et al. |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,515,107 A | 5/1996 | Chiang et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A | 5/1997 | Carrubba et al. |
| 5,629,981 A | 5/1997 | Nerlikar |
| 5,652,615 A | 7/1997 | Bryant et al. |
| 5,652,795 A | 7/1997 | Dillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimodo et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A * | 5/1998 | Aras et al. ............... 725/14 |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,835,668 A | 11/1998 | Yanagihara |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,892,900 A | 4/1999 | Ginter et al. |
| 5,894,320 A | 4/1999 | Vancelette |
| 5,894,516 A | 4/1999 | Brandenburg |
| 5,905,732 A | 5/1999 | Fimoff et al. |
| 5,915,018 A | 6/1999 | Aucsmith |

| | | | | | | | |
|---|---|---|---|---|---|---|---|
| 5,917,830 | A | 6/1999 | Chen et al. | 6,229,576 | B1 | 5/2001 | Tarr et al. |
| 5,920,625 | A | 7/1999 | Davies | 6,229,895 | B1 | 5/2001 | Son et al. |
| 5,920,626 | A | 7/1999 | Durden et al. | 6,230,194 | B1 | 5/2001 | Frailong et al. |
| 5,922,048 | A | 7/1999 | Emura | 6,230,266 | B1 | 5/2001 | Perlman et al. |
| 5,923,755 | A | 7/1999 | Birch et al. | 6,236,727 | B1 | 5/2001 | Ciacelli et al. |
| 5,930,361 | A | 7/1999 | Hayashi et al. | 6,240,553 | B1 | 5/2001 | Son et al. |
| 5,933,498 | A | 8/1999 | Schneck et al. | 6,246,720 | B1 | 6/2001 | Kutner et al. |
| 5,933,500 | A | 8/1999 | Blatter et al. | 6,256,747 | B1 | 7/2001 | Inohara et al. |
| 5,940,738 | A | 8/1999 | Rao | 6,263,506 | B1 | 7/2001 | Ezaki et al. |
| 5,943,605 | A | 8/1999 | Koepele, Jr. | 6,266,416 | B1 | 7/2001 | Sigbjornsen et al. |
| 5,949,877 | A | 9/1999 | Traw et al. | 6,266,480 | B1 | 7/2001 | Ezaki et al. |
| 5,949,881 | A | 9/1999 | Davis | 6,272,538 | B1 | 8/2001 | Holden et al. |
| 5,963,909 | A | 10/1999 | Warren et al. | 6,278,783 | B1 | 8/2001 | Kocher et al. |
| 5,973,679 | A | 10/1999 | Abbott et al. | 6,289,455 | B1 | 9/2001 | Kocher et al. |
| 5,973,722 | A | 10/1999 | Wakai et al. | 6,292,568 | B1 | 9/2001 | Atkins, III et al. |
| 5,973,726 | A | 10/1999 | Iijima et al. | 6,292,892 | B1 | 9/2001 | Davis |
| 5,999,622 | A | 12/1999 | Yasukawa et al. | 6,307,939 | B1 | 10/2001 | Vigarie |
| 5,999,698 | A | 12/1999 | Nakai et al. | 6,311,012 | B1 | 10/2001 | Cho et al. |
| 6,005,561 | A | 12/1999 | Hawkins et al. | 6,314,111 | B1 | 11/2001 | Nandikonda et al. |
| 6,005,940 | A | 12/1999 | Kulinets | 6,314,409 | B2 | 11/2001 | Schneck et al. |
| 6,011,849 | A | 1/2000 | Orrin | 6,323,914 | B1 | 11/2001 | Linzer |
| 6,012,144 | A | 1/2000 | Pickett | 6,324,288 | B1 | 11/2001 | Hoffman |
| 6,016,348 | A | 1/2000 | Blatter et al. | 6,327,421 | B1 | 12/2001 | Tiwari et al. |
| 6,021,199 | A | 2/2000 | Ishibashi | 6,337,947 | B1 * | 1/2002 | Porter et al. .................. 386/55 |
| 6,021,201 | A | 2/2000 | Bakhle et al. | 6,351,538 | B1 | 2/2002 | Uz |
| 6,026,164 | A | 2/2000 | Sakamoto et al. | 6,351,813 | B1 | 2/2002 | Mooney et al. |
| 6,028,932 | A | 2/2000 | Park | 6,377,589 | B1 | 4/2002 | Knight et al. |
| 6,049,613 | A | 4/2000 | Jakobsson | 6,378,130 | B1 | 4/2002 | Adams |
| 6,055,314 | A | 4/2000 | Spies et al. | 6,389,533 | B1 | 5/2002 | Davis et al. |
| 6,055,315 | A | 4/2000 | Doyle et al. | 6,389,537 | B1 | 5/2002 | Davis et al. |
| 6,057,832 | A | 5/2000 | Lev et al. | 6,415,031 | B1 | 7/2002 | Colligan et al. |
| 6,057,872 | A | 5/2000 | Candelore | 6,415,101 | B1 | 7/2002 | deCarmo et al. |
| 6,058,186 | A | 5/2000 | Enari | 6,418,169 | B1 | 7/2002 | Datari |
| 6,058,192 | A | 5/2000 | Guralnick et al. | 6,424,717 | B1 | 7/2002 | Pinder et al. |
| 6,061,451 | A | 5/2000 | Muratani et al. | 6,430,361 | B2 | 8/2002 | Lee |
| 6,061,471 | A | 5/2000 | Coleman, Jr. | 6,445,738 | B1 | 9/2002 | Zdepski et al. |
| 6,064,676 | A | 5/2000 | Slattery et al. | 6,449,718 | B1 | 9/2002 | Rucklidge et al. |
| 6,064,748 | A | 5/2000 | Hogan | 6,452,923 | B1 | 9/2002 | Gerszberg et al. |
| 6,065,050 | A | 5/2000 | DeMoney | 6,453,115 | B1 | 9/2002 | Boyle |
| 6,069,647 | A | 5/2000 | Sullivan et al. | 6,453,116 | B1 | 9/2002 | Ando et al. |
| 6,070,245 | A | 5/2000 | Murphy, Jr. et al. | 6,456,985 | B1 | 9/2002 | Ohtsuka |
| 6,072,872 | A | 6/2000 | Chang et al. | 6,459,427 | B1 | 10/2002 | Mao et al. |
| 6,072,873 | A | 6/2000 | Bewick | 6,460,018 | B1 | 10/2002 | Kasai et al. |
| 6,073,122 | A | 6/2000 | Wool | 6,463,445 | B1 | 10/2002 | Suzuki et al. |
| 6,088,450 | A | 7/2000 | Davis et al. | 6,466,671 | B1 | 10/2002 | Maillard et al. |
| 6,105,134 | A | 8/2000 | Pinder et al. | 6,473,459 | B1 | 10/2002 | Sugano et al. |
| 6,108,422 | A | 8/2000 | Newby et al. | 6,480,551 | B1 | 11/2002 | Ohishi et al. |
| 6,115,821 | A | 9/2000 | Newby et al. | 6,490,728 | B1 | 12/2002 | Kitazato et al. |
| 6,118,873 | A | 9/2000 | Lotspiech et al. | 6,505,032 | B1 | 1/2003 | McCorkle et al. |
| 6,134,237 | A | 10/2000 | Brailean et al. | 6,505,299 | B1 | 1/2003 | Zeng et al. |
| 6,134,551 | A | 10/2000 | Aucsmith | 6,510,554 | B1 | 1/2003 | Gordon et al. |
| 6,138,237 | A | 10/2000 | Ruben et al. | 6,519,693 | B1 | 2/2003 | Debey |
| 6,148,082 | A | 11/2000 | Slattery et al. | 6,526,144 | B2 | 2/2003 | Markandey et al. |
| 6,154,206 | A | 11/2000 | Ludtke | 6,529,526 | B1 | 3/2003 | Schneidewend |
| 6,157,719 | A | 12/2000 | Wasilewski et al. | 6,543,053 | B1 | 4/2003 | Li et al. |
| 6,160,548 | A | 12/2000 | Lea et al. | 6,549,229 | B1 | 4/2003 | Kirby et al. |
| 6,170,075 | B1 | 1/2001 | Schuster et al. | 6,550,008 | B1 | 4/2003 | Zhang et al. |
| 6,181,334 | B1 | 1/2001 | Freeman et al. | 6,557,031 | B1 | 4/2003 | Mimura et al. |
| 6,181,364 | B1 * | 1/2001 | Ford ............................ 725/32 | 6,587,561 | B1 | 7/2003 | Sered et al. |
| 6,185,369 | B1 | 2/2001 | Ko et al. | 6,590,979 | B1 | 7/2003 | Ryan |
| 6,185,546 | B1 | 2/2001 | Davis | 6,621,866 | B1 | 9/2003 | Florencio et al. |
| 6,189,096 | B1 | 2/2001 | Haverty | 6,621,979 | B1 | 9/2003 | Eerenberg et al. |
| 6,192,131 | B1 | 2/2001 | Geer, Jr. et al. | 6,640,145 | B2 | 10/2003 | Hoffberg et al. |
| 6,199,053 | B1 | 3/2001 | Herbert et al. | 6,640,305 | B2 | 10/2003 | Kocher et al. |
| 6,201,927 | B1 | 3/2001 | Comer | 6,643,298 | B1 | 11/2003 | Brunheroto et al. |
| 6,204,843 | B1 | 3/2001 | Freeman et al. | 6,650,754 | B2 | 11/2003 | Akiyama et al. |
| 6,209,098 | B1 | 3/2001 | Davis | 6,654,389 | B1 | 11/2003 | Brunheroto et al. |
| 6,215,484 | B1 | 4/2001 | Freeman et al. | 6,678,740 | B1 | 1/2004 | Rakib et al. |
| 6,219,358 | B1 | 4/2001 | Pinder et al. | 6,681,326 | B2 | 1/2004 | Son et al. |
| 6,222,924 | B1 | 4/2001 | Salomaki | 6,684,250 | B2 | 1/2004 | Anderson et al. |
| 6,223,290 | B1 | 4/2001 | Larsen et al. | 6,697,489 | B1 | 2/2004 | Candelore |
| 6,226,385 | B1 | 5/2001 | Taguchi et al. | 6,697,944 | B1 | 2/2004 | Jones et al. |
| 6,226,618 | B1 | 5/2001 | Downs et al. | 6,701,258 | B2 | 3/2004 | Kramb et al. |

| | | | | | | |
|---|---|---|---|---|---|---|
| 6,704,733 | B2 | 3/2004 | Clark et al. | 2002/0083439 A1 | 6/2002 | Eldering |
| 6,707,696 | B1 | 3/2004 | Turner et al. | 2002/0097322 A1 | 7/2002 | Monroe et al. |
| 6,714,650 | B1 | 3/2004 | Maillard et al. | 2002/0100054 A1 | 7/2002 | Feinberg et al. |
| 6,741,795 | B1 | 5/2004 | Takehiko et al. | 2002/0108035 A1 | 8/2002 | Herley et al. |
| 6,754,276 | B1 | 6/2004 | Harumoto et al. | 2002/0109707 A1 | 8/2002 | Lao et al. |
| 6,771,285 | B1 | 8/2004 | McGrath et al. | 2002/0116705 A1 | 8/2002 | Perlman et al. |
| 6,772,340 | B1 | 8/2004 | Peinado et al. | 2002/0126890 A1 | 9/2002 | Katayama et al. |
| 6,788,690 | B2 | 9/2004 | Harri | 2002/0129243 A1 | 9/2002 | Nanjundiah |
| 6,788,882 | B1 | 9/2004 | Geer et al. | 2002/0144116 A1 | 10/2002 | Giobbi |
| 6,826,185 | B1 | 11/2004 | Montanaro et al. | 2002/0144260 A1 | 10/2002 | Devara |
| 6,853,728 | B1 | 2/2005 | Kahn et al. | 2002/0150239 A1 | 10/2002 | Carny et al. |
| 6,883,050 | B1 | 4/2005 | Safadi | 2002/0157115 A1 | 10/2002 | Lu |
| 6,891,565 | B1 | 5/2005 | Dietrich | 2002/0164022 A1 | 11/2002 | Strasser et al. |
| 6,895,128 | B2 | 5/2005 | Bohnenkamp | 2002/0170053 A1 | 11/2002 | Peterka et al. |
| 6,904,520 | B1 | 6/2005 | Rosset et al. | 2002/0184506 A1 | 12/2002 | Perlman |
| 6,917,684 | B1 | 7/2005 | Tatebayashi et al. | 2002/0194589 A1 | 12/2002 | Cristofalo et al. |
| 6,925,180 | B2 | 8/2005 | Iwamura | 2002/0194613 A1 | 12/2002 | Unger |
| 6,938,162 | B1 | 8/2005 | Nagai et al. | 2002/0196939 A1 | 12/2002 | Unger et al. |
| 6,973,187 | B2 | 12/2005 | Gligor et al. | 2003/0002854 A1 | 1/2003 | Belknap et al. |
| 6,976,166 | B2 | 12/2005 | Herley et al. | 2003/0009669 A1 | 1/2003 | White et al. |
| 6,988,238 | B1 | 1/2006 | Kovacevic et al. | 2003/0012286 A1 | 1/2003 | Ishtiaq et al. |
| 7,023,924 | B1 | 4/2006 | Keller et al. | 2003/0021412 A1 | 1/2003 | Candelore et al. |
| 7,039,802 | B1 | 5/2006 | Eskicioglu et al. | 2003/0026423 A1 | 2/2003 | Unger et al. |
| 7,039,938 | B2 | 5/2006 | Candelore | 2003/0028879 A1 | 2/2003 | Gordon et al. |
| 7,055,166 | B1 | 5/2006 | Logan et al. | 2003/0034997 A1 | 2/2003 | McKain et al. |
| 7,065,213 | B2 | 6/2006 | Pinder | 2003/0035482 A1 | 2/2003 | Klompenhouwer et al. |
| 7,079,752 | B1 | 7/2006 | Leyendecker | 2003/0035540 A1 | 2/2003 | Freeman et al. |
| 7,089,579 | B1 | 8/2006 | Mao et al. | 2003/0035543 A1 | 2/2003 | Gillon |
| 7,096,481 | B1 | 8/2006 | Forecast et al. | 2003/0046687 A1 | 3/2003 | Hodges et al. |
| 7,096,487 | B1 | 8/2006 | Gordon et al. | 2003/0059047 A1 | 3/2003 | Iwamura |
| 7,110,659 | B2 | 9/2006 | Fujie et al. | 2003/0063615 A1 | 4/2003 | Luoma et al. |
| 7,120,250 | B2 | 10/2006 | Candelore | 2003/0072555 A1 | 4/2003 | Yap et al. |
| 7,124,303 | B2 | 10/2006 | Candelore | 2003/0077071 A1 | 4/2003 | Lin et al. |
| 7,127,619 | B2 | 10/2006 | Unger et al. | 2003/0081630 A1 | 5/2003 | Mowery et al. |
| 7,139,398 | B2 | 11/2006 | Candelore et al. | 2003/0081776 A1 | 5/2003 | Candelore |
| 7,146,007 | B1 | 12/2006 | Maruo et al. | 2003/0084284 A1 | 5/2003 | Ando et al. |
| 7,151,831 | B2 | 12/2006 | Candelore et al. | 2003/0097662 A1 | 5/2003 | Russ et al. |
| 7,151,833 | B2 | 12/2006 | Candelore et al. | 2003/0108199 A1 | 6/2003 | Pinder et al. |
| 7,155,012 | B2 | 12/2006 | Candelore et al. | 2003/0112333 A1 | 6/2003 | Chen et al. |
| 7,158,185 | B2 | 1/2007 | Gastaldi | 2003/0118243 A1 | 6/2003 | Sezer et al. |
| 7,194,758 | B1 | 3/2007 | Waki et al. | 2003/0123664 A1 | 7/2003 | Pedlow, Jr. et al. |
| 7,221,706 | B2 | 5/2007 | Zhao et al. | 2003/0123849 A1 | 7/2003 | Nallur et al. |
| 7,292,692 | B2 | 11/2007 | Bonan et al. | 2003/0126086 A1 | 7/2003 | Safadi |
| 7,298,959 | B1 | 11/2007 | Hallberg et al. | 2003/0133570 A1 | 7/2003 | Candelore et al. |
| 7,336,785 | B1 | 2/2008 | Lu et al. | 2003/0140257 A1 | 7/2003 | Peterka et al. |
| 7,391,866 | B2 | 6/2008 | Fukami et al. | 2003/0152224 A1 | 8/2003 | Candelore et al. |
| 7,490,236 | B2 | 2/2009 | Wasilewski | 2003/0152232 A1 | 8/2003 | Pirila et al. |
| 7,490,344 | B2 | 2/2009 | Haberman et al. | 2003/0156718 A1 | 8/2003 | Candelore et al. |
| 7,496,198 | B2 | 2/2009 | Pinder et al. | 2003/0159139 A1 | 8/2003 | Candelore et al. |
| 7,508,454 | B1 | 3/2009 | Vantalon et al. | 2003/0159140 A1 | 8/2003 | Candelore |
| 7,555,123 | B2 | 6/2009 | Pinder et al. | 2003/0159152 A1 | 8/2003 | Lin et al. |
| 2001/0013123 | A1 | 8/2001 | Freeman et al. | 2003/0174837 A1 | 9/2003 | Candelore et al. |
| 2001/0017885 | A1 | 8/2001 | Asai et al. | 2003/0174844 A1 | 9/2003 | Candelore |
| 2001/0024471 | A1 | 9/2001 | Bordes et al. | 2003/0188154 A1 | 10/2003 | Dallard |
| 2001/0030959 | A1 | 10/2001 | Ozawa et al. | 2003/0188164 A1 | 10/2003 | Okimoto et al. |
| 2001/0036271 | A1 | 11/2001 | Javed | 2003/0190054 A1 | 10/2003 | Troyansky et al. |
| 2001/0051007 | A1 | 12/2001 | Teshima | 2003/0193973 A1 | 10/2003 | Takashimizu et al. |
| 2002/0003881 | A1 | 1/2002 | Reitmeier et al. | 2003/0198223 A1 | 10/2003 | Mack et al. |
| 2002/0021805 | A1 | 2/2002 | Schumann et al. | 2003/0204717 A1 | 10/2003 | Kuehnel |
| 2002/0023013 | A1 | 2/2002 | Hughes et al. | 2003/0222994 A1 | 12/2003 | Dawson |
| 2002/0026478 | A1 | 2/2002 | Rodgers et al. | 2003/0226149 A1 | 12/2003 | Chun et al. |
| 2002/0026587 | A1 | 2/2002 | Talstra et al. | 2003/0228018 A1 | 12/2003 | Vince |
| 2002/0036717 | A1 | 3/2002 | Abiko et al. | 2004/0003008 A1 | 1/2004 | Wasilewski et al. |
| 2002/0044558 | A1 | 4/2002 | Gobbi et al. | 2004/0010717 A1 | 1/2004 | Simec et al. |
| 2002/0046406 | A1 | 4/2002 | Chelehmal et al. | 2004/0021764 A1 | 2/2004 | Driscoll, Jr. et al. |
| 2002/0047915 | A1 | 4/2002 | Misu | 2004/0028227 A1 | 2/2004 | Yu |
| 2002/0056093 | A1 | 5/2002 | Kunkel et al. | 2004/0037421 A1 | 2/2004 | Truman |
| 2002/0059425 | A1 | 5/2002 | Belfiore et al. | 2004/0047470 A1 | 3/2004 | Candelore |
| 2002/0065678 | A1 | 5/2002 | Peliotis et al. | 2004/0049688 A1 | 3/2004 | Candelore |
| 2002/0066101 | A1 | 5/2002 | Gordon et al. | 2004/0049690 A1 | 3/2004 | Candelore et al. |
| 2002/0067436 | A1 | 6/2002 | Shirahama et al. | 2004/0049694 A1 | 3/2004 | Candelore |
| 2002/0083317 | A1 | 6/2002 | Ohta et al. | 2004/0064688 A1 | 4/2004 | Jacobs |
| 2002/0083438 | A1 | 6/2002 | So et al. | 2004/0068659 A1 | 4/2004 | Diehl |

| | | | | | | |
|---|---|---|---|---|---|---|
| 2004/0073917 | A1 | 4/2004 | Pedlow, Jr. et al. | EP | 0833517 | 4/1998 |
| 2004/0078575 | A1 | 4/2004 | Morten et al. | EP | 0866615 | 9/1998 |
| 2004/0081333 | A1 | 4/2004 | Grab et al. | EP | 0 926 894 | 6/1999 |
| 2004/0083177 | A1 | 4/2004 | Chen et al. | EP | 1187483 | 3/2002 |
| 2004/0086127 | A1 | 5/2004 | Candelore | JP | 61-264371 | 11/1986 |
| 2004/0088552 | A1 | 5/2004 | Candelore | JP | 07-046575 | 2/1995 |
| 2004/0088558 | A1 | 5/2004 | Candelore | JP | 7067028 | 3/1995 |
| 2004/0091109 | A1 | 5/2004 | Son et al. | JP | 10-336624 | 12/1998 |
| 2004/0100510 | A1 | 5/2004 | Milic-Frayling et al. | JP | 2000-125260 | 4/2000 |
| 2004/0123094 | A1 | 6/2004 | Sprunk | JP | 2001-69480 | 3/2001 |
| 2004/0136532 | A1 | 7/2004 | Pinder et al. | JP | 2001-117809 | 4/2001 |
| 2004/0139337 | A1 | 7/2004 | Pinder et al. | JP | 2001-242786 | 9/2001 |
| 2004/0151314 | A1 | 8/2004 | Candelore | JP | 11243534 | 10/2002 |
| 2004/0158721 | A1 | 8/2004 | Candelore | JP | 2003-122710 | 4/2003 |
| 2004/0165586 | A1 | 8/2004 | Read et al. | KR | 299634 | 8/2008 |
| 2004/0168121 | A1* | 8/2004 | Matz ........................ 715/513 | WO | WO 86/07224 | 12/1986 |
| 2004/0172650 | A1 | 9/2004 | Hawkins et al. | WO | WO 93/09525 | 5/1993 |
| 2004/0181666 | A1 | 9/2004 | Candelore | WO | WO 94/10775 | 5/1994 |
| 2004/0187161 | A1 | 9/2004 | Cao | WO | WO 94/13081 | 6/1994 |
| 2004/0193550 | A1 | 9/2004 | Siegal | WO | WO 94/13107 | 6/1994 |
| 2004/0240668 | A1 | 12/2004 | Bonan et al. | WO | WO 95/28058 | 4/1995 |
| 2004/0247122 | A1 | 12/2004 | Hobrock et al. | WO | WO 97/38530 | 10/1997 |
| 2004/0261099 | A1 | 12/2004 | Durden et al. | WO | WO 97/46009 | 12/1997 |
| 2004/0264924 | A1 | 12/2004 | Campisano et al. | WO | WO 98/08341 | 2/1998 |
| 2004/0267602 | A1 | 12/2004 | Gaydos et al. | WO | WO 00/31964 | 6/2000 |
| 2005/0004875 | A1 | 1/2005 | Kontio et al. | WO | WO 00/59203 | 10/2000 |
| 2005/0015816 | A1 | 1/2005 | Cristofalo et al. | WO | WO 00/60846 | 10/2000 |
| 2005/0028193 | A1 | 2/2005 | Candelore et al. | WO | WO 00/64164 | 10/2000 |
| 2005/0036067 | A1 | 2/2005 | Ryal et al. | WO | WO 00/70817 | 11/2000 |
| 2005/0063541 | A1 | 3/2005 | Candelore | WO | WO 01/26372 | 4/2001 |
| 2005/0066357 | A1 | 3/2005 | Ryal | WO | WO 01/35669 | 5/2001 |
| 2005/0071669 | A1 | 3/2005 | Medvinsky et al. | WO | WO 01/65762 | 9/2001 |
| 2005/0094808 | A1 | 5/2005 | Pedlow, Jr. et al. | WO | WO 01/67667 | 9/2001 |
| 2005/0094809 | A1 | 5/2005 | Pedlow, Jr. et al. | WO | WO 01/78386 | 10/2001 |
| 2005/0097596 | A1 | 5/2005 | Pedlow, Jr. | WO | WO 02/51096 | 6/2002 |
| 2005/0097597 | A1 | 5/2005 | Pedlow, Jr. et al. | | | |
| 2005/0097598 | A1 | 5/2005 | Pedlow, Jr. et al. | | | |
| 2005/0097614 | A1 | 5/2005 | Pedlow, Jr. et al. | | | |
| 2005/0102702 | A1 | 5/2005 | Candelore et al. | | | |
| 2005/0129233 | A1 | 6/2005 | Pedlow, Jr. | | | |
| 2005/0141713 | A1 | 6/2005 | Genevois | | | |
| 2005/0169473 | A1 | 8/2005 | Candelore | | | |
| 2005/0192904 | A1 | 9/2005 | Candelore | | | |
| 2005/0198586 | A1 | 9/2005 | Sekiguchi et al. | | | |
| 2005/0259813 | A1 | 11/2005 | Wasilewski et al. | | | |
| 2005/0265547 | A1 | 12/2005 | Strasser et al. | | | |
| 2005/0283797 | A1 | 12/2005 | Eldering et al. | | | |
| 2006/0115083 | A1 | 6/2006 | Candelore et al. | | | |
| 2006/0130119 | A1 | 6/2006 | Candelore et al. | | | |
| 2006/0130121 | A1* | 6/2006 | Candelore et al. ........... 725/145 | | | |
| 2006/0136976 | A1 | 6/2006 | Coupe et al. | | | |
| 2006/0153379 | A1 | 7/2006 | Candelore et al. | | | |
| 2006/0168616 | A1 | 7/2006 | Candelore | | | |
| 2006/0174264 | A1 | 8/2006 | Candelore | | | |
| 2006/0262926 | A1 | 11/2006 | Candelore et al. | | | |
| 2006/0269060 | A1 | 11/2006 | Candelore et al. | | | |
| 2007/0006253 | A1 | 1/2007 | Pinder et al. | | | |
| 2007/0091886 | A1 | 4/2007 | Davis et al. | | | |
| 2009/0210698 | A1 | 8/2009 | Candelore | | | |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 696 141 | 7/1995 |
| EP | 0674440 | 9/1995 |
| EP | 0674441 | 9/1995 |
| EP | 0720374 | 7/1996 |
| EP | 0382764 | 4/1997 |

OTHER PUBLICATIONS

"MPEG-2 Compliant Trick Play Over a Digital Interface," van Gassel et al., IEEE pp. 170-171., 2002.
International Search Report and Written Opinion, PCT/US07/02489, Jul. 23, 2008.
"How Networks Work" Derfler and Freed, Ziff-Davis Press, 1996.
"How Computers Work—Millennium Edition," Ron White, Que Corporation, 1999.
"How the Internet Works—Millennium Edition," Preston Gralla, Que Corporation, 1999.
"Desktop Encyclopedia of the Internet," Nathan J. Muller, Artech House, 1999.
"MPEG-2 Transmission," Dr. Gorry Fairhurst, Jan. 2001.
Microsoft Windows XP, Oct. 2001, Microsoft, Screen Shots and Help Files.
MPEG-2 Digital Broadcast Pocket Guide vol. 6, Copyright 201 Acterna, LLC.
"K-Time Encryption for K-Time Licensing," Perkins, et al., IEEE, 2002.
"Partial Encryption of Compressed Images and Videos," Howard Cheng et al. IEEE 2000.
"Secure Transmission of MPEG Video Sources," Teixeira et al., date unknown.
"DVB Conditional Access," David Cutts, Electronics and Communication Engineering Journal, Feb. 1997.
European Supplementary Search Report for EP 07 76 2735, May 26, 2009.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"DVD Demystified—The Guidebook for DVD-Video and DVD-ROM" by Jim Taylor, Pub. McGraw-Hill, 1998, ISBN: 0-07-064841-7, pp. 134-147.

"Efficient Frequency Domain Video Scrambling for Content Access Control" by Zeng and Lei, Nov. 1999, In Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

"Multimedia and Security Workshop at ACM Multimedia" '98. Bristol, U.K., Sep. 1998.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"Transport Streams Insertion of Video in the Compressed Digital Domain" by SeaChange International, Web Site Literature, 2000.

"Visible World—A High Impact Approach to Customized Television Advertising" by Haberman, Dec. 2001.

Anonymous, Message Authentication with Partial Encryption, Research discosure RD 296086, Dec. 10, 1998.

Anonymous, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future HDTV Digital VTR", Sony Corporation, (1991).

Kunkelmann T. et al., A Scalable Security Architecture for Multimedia Communication Standards, Darmstard Univ. of Technology, ITO, Germany, 1997, pp. 660-661.

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Liu et al., Motion Vector Encryption in Multimedia Streaming, 2004, IEEE, pp. 64-71.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Yip, Kun-Wah, Partial-Encryption Technique for Intellectual Property Protection of FPGA-Based Products, Dec. 15, 1999, IEEE, pp. 183-190.

Zhu, et al., "Coding and Cell-Loss Recovery in DCT-Based Packet Video", IEEE Transactions on Circuits and Systems for Video Technology, No. 3, NY,(Jun. 3, 1993).

"Coral Consortium Aims to Make DRM Interoperable", by Bill Rosenblatt, Oct. 7, 2004, online at www.drmwatch.com/standards/article.php/3418741.

"Passage™, Freedom to Choose", 2003, Sony Electronics Inc.

"The Long March to Interoperable Digital Rights Management" by Koenen et al., pp. 1-17, 2004, IEEE.

McCormac Hack Over Cablemodem, HackWatchAug. 10, 1998.

"ClearPlay: The Technology of Choice", from web site, ClearPlay 2001-2003.

Perry et al, "Final Report of the Co-Chairs of the Broadcast Protection Discussion Subgroup to the Copy Protection Technical Working Group," Jun. 3, 2003.

Anonymous, Rehabilitation of Digital Television, CEATEC Japan 2003, Special Report, Jan. 2003. (*Translation provided by Japanese associate*).

Teixeira et al., Secure Transmission of MPEG Video Sources, Nov. 6, 1998 (*Resubmitted with date provided by Wayback machine.*).

Anonymous—Functional Model of a Condtional Access System; EBU Project Group B/CA, EBU Review Technical, Winter No. 266, Grand-Saconnex, CH; pp. 64-77; 1995.

* cited by examiner

CONTENT SUBSTITUTION EDITOR

This application is a continuation-in-part of pending U.S. patent application Ser. No. 11/292,256 filed Dec. 1, 2005 which claims priority benefit of U.S. Provisional Patent Applications 60/636,504 filed Dec. 15, 2004 and 60/637,305 filed Dec. 16, 2004; and this application is related to U.S. patent application Ser. Nos. 10/319,066; 10/667,614; and 10/822,891 relate to mechanisms for content replacement and which are hereby incorporated herein by reference.

BACKGROUND

Audio-visual content, such as television programming, movies, digital versatile discs (DVD), and the like, sometimes contain content which certain people may find objectionable. It may be objectionable either for them personally or they may consider it objectionable for children or others to view. The above-referenced patent applications are related to a mechanism that can be used for replacement of objectionable content (or content replacement for any other reason).

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content which would be interpreted as and reported in an electronic program guide (EPG) as a single television program, without regard for whether the content is a movie, sporting event, segment of a multi-part series, news broadcast, etc.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as meaning either or all. Therefore, "A, B or C" means "any of the following: A; B; C; A and B; A and C; B and C; A, B and C". An exception to this definition will occur only when a combination of elements, functions, steps or acts are in some way inherently mutually exclusive.

In order to provide content which can be manipulated to provide alternatives, e.g., in the case of providing alternative content to modify the rating of a movie or television program, an authoring tool is needed. Current linear and non-linear editing tools do not provide this capability.

The management of alternate content for use in dynamic substitution applications such as the removal/restoration of potentially objectionable content can be implemented during content authoring/editing using a nonlinear editing system consistent with certain embodiments of the present invention. Turing to FIG. 1, an example is presented of the content relationships in a nonlinear editing system. In such a system, video scenes 10, dialog tracks 12 and 14, along with music tracks such as 16 and other audio tracks 18 are associated with a master timeline 20. This information is stored in a "non-linear" fashion. The term "non-linear" storage is used in the art to differentiate digital storage, e.g., using disc drive technology, in contrast to "linear" storage that uses tape and film as the storage medium. By use of non-linear storage, any element of the content can be randomly accessed without need to traverse a length of "linear" medium such as film or tape to reach the element of content. Elements 10-18 may be stored as discrete elements anywhere on the disc drive or other non-linear storage medium and manipulated, rearranged, substituted, etc. in the non-linear editing process.

Nonlinear editing systems have become the prevalent method of content authoring for television and increasingly so for film. A nonlinear editing system can be used to select the desired portions of audio and video sequences (scenes) taken from a library containing all the raw footage/video and audio recordings under consideration for the project (e.g., video, movie or television program) and then establish their temporal relationships, both with the adjacent sequences of the same type (video, dialog, music score, etc.) as well as to establish the synchronization of the video with one or more corresponding audio tracks. Even though the end product appears as one continuous video sequence with a single synchronized audio track (containing a composite of multiple audio elements), all components that make up the content remain distinct and separate while being manipulated in the editing system.

Figure 1:
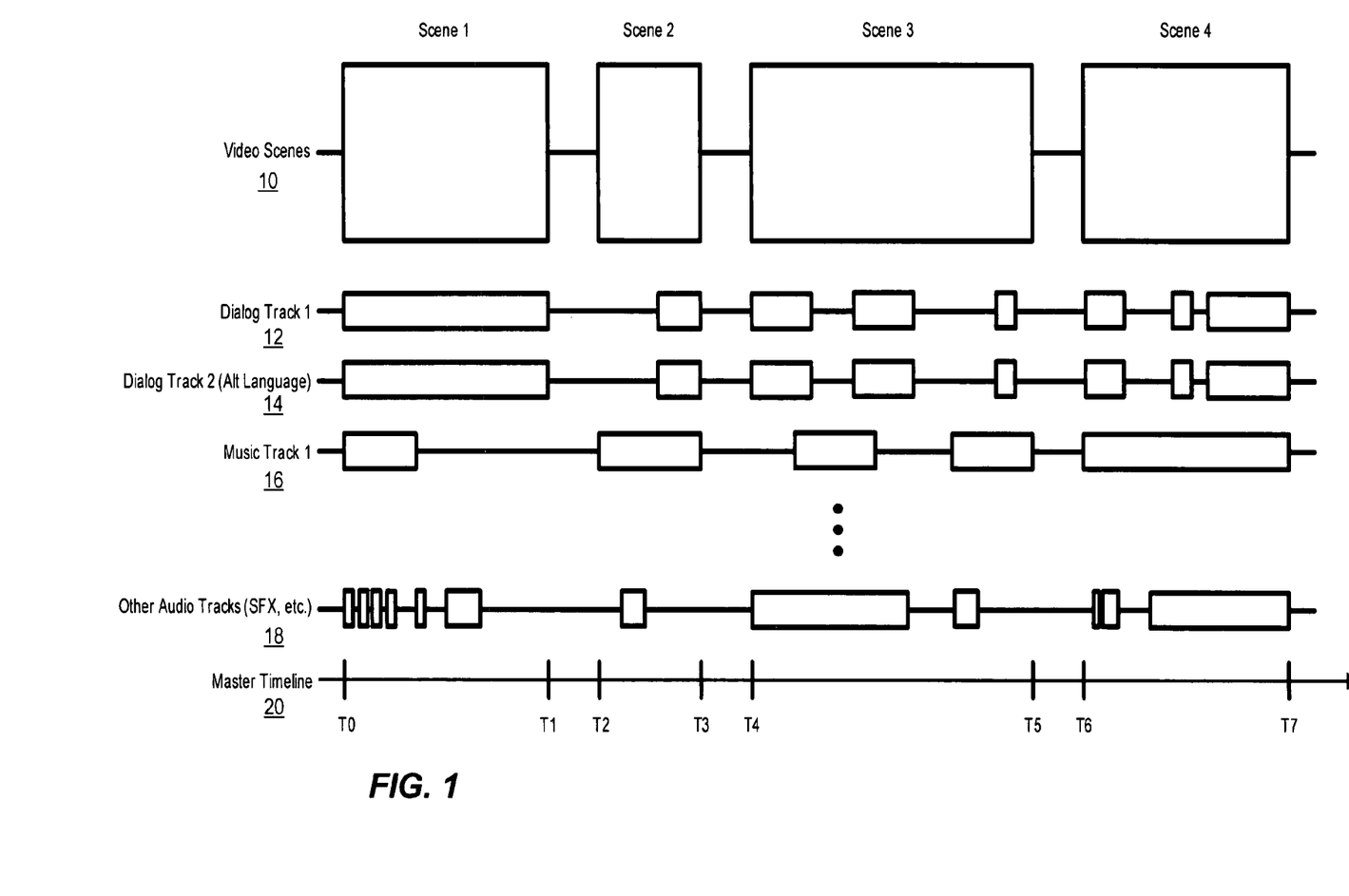
FIG. 1 depicts an example of content and their temporal relationships in a nonlinear editing system.

FIG. 1 shows an example depiction of content in a nonlinear editing system and their temporal relationships. In the case of a conventional editing system, no provision is made for assuring synchronization of multiple sets of content in which certain "scenes" can be substituted for others in a transparent manner at playback. Selective multiple encryption systems, consistent with Sony's Passage™ system utilize mapping of Packet Identifiers (PIDs) to achieve a multiple carriage of content destined for differing encryption systems. The above-referenced patent applications utilize a similar system of PID mapping to achieve content replacement functions. However, to date, the issue of how to author content for such systems has not been addressed.

Figure 2:
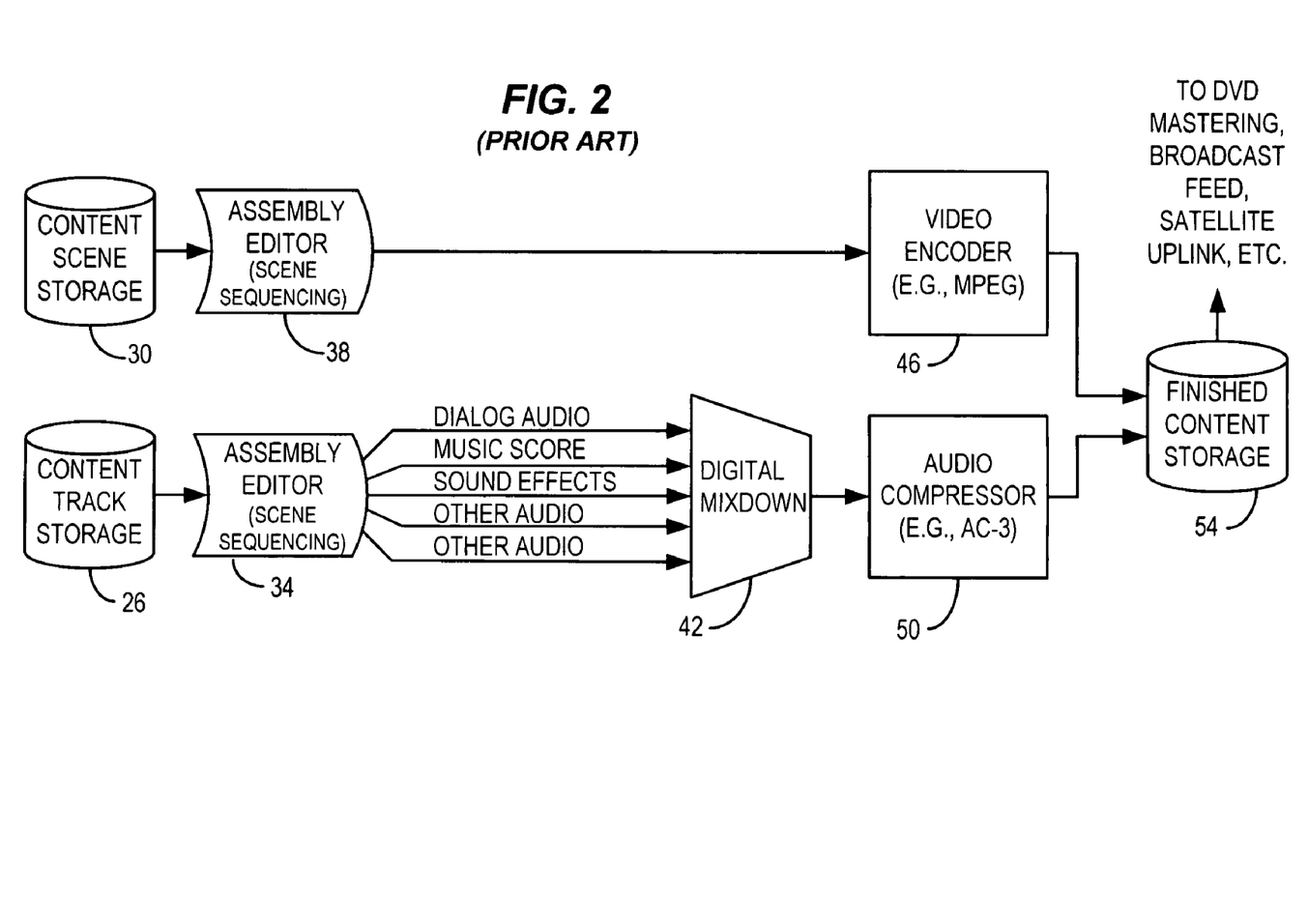
FIG. 2 shows the process flow of content once the editing process has been completed.

FIG. 2 shows the process flow of content once the nonlinear editing process has been completed for conventional non-linear editing systems. The content stored in most professional nonlinear editing systems is uncompressed digitized video and pulse code modulated (PCM) audio samples. This content is depicted in FIG. 2 as content track storage 26 and content scene storage 30. It is generally considered much easier to edit video sequences and edit/combine (mix) audio samples in this raw form and maintain high picture and sound quality. The sequencing of the audio and video content is depicted at 34 and 38 respectively.

When the final edited version of the content is completed, it can then be assembled into its final video and audio sequences and the audio mixed to its final monophonic, stereophonic or surround sound image at the output of digital mixdown 42. The various audio tracks (dialog, music, sound effects, etc.) are mixed down at a mixdown process depicted as a digital mixdown 42. The finished "cut" is then compressed using, for example without intent of any limitation using MPEG (e.g., MPEG-2) compression for the video at 46 and AC-3 audio compression at 50 for the video and audio content, respectively, to reduce the size of the file containing the final product. Any other suitable compression and encoding technique could be used including, but not limited to for example AAC, DTS, MPEG-1, etc. for audio, and AVC, VC-1, MPEG-4, etc. for video. Embodiments consistent with the present invention also contemplate use with other encoding and compression mechanisms, existing or not yet developed. Commonly, compression by a factor of 80 or greater is achieved. This reduction in storage makes the transmission, broadcast and/or storage of digital video content more practical, allowing it to fit on inexpensive media like DVDs or to be carried in a standard 6 MHz RF spectral channel concurrent with eight or more other A/V services with minimal degradation of quality. The final content can be stored at 54, and from there, may be used for any number of purposes including DVD mastering, satellite, cable, or terrestrial broadcasting.

A similar process can be followed in order to create an alternate audio track in a second language. In this case, the same audio tracks containing the musical score, sound effects, etc. are used but an alternate dialog track, edited to match the duration and context of the common video content, is substituted for the primary language dialog track. An alternate composite audio track can be created by a separate mixdown and encoding process, paralleling that used to create the primary audio track. The second audio track may then be either carried concurrently with the video and primary audio track for multilingual support or it can be substituted in its entirety for the primary audio for content intended exclusively for an alternate language.

It should be noted that in all cases, there is a single, continuous video/visual track running at a constant rate (e.g., 24 or 60 frames per second) that depends upon media type, in the final "cut". This track is always present, even if the actual content of the visual track contains a black screen. All audio content is synchronized to the visual track to maintain proper lip to voice synchronization and appropriate timing of sound effect and musical score occurrence. Unlike the visual track, audio may or may not be present, depending upon the context of the scene. Once the final cut is produced and compressed, like the video track, there is a continuous audio track. During periods of silence, compressed audio data is still present, but the data values indicate a silent period. Hence, synchronization of the second audio track with the video is routine.

Figure 3:
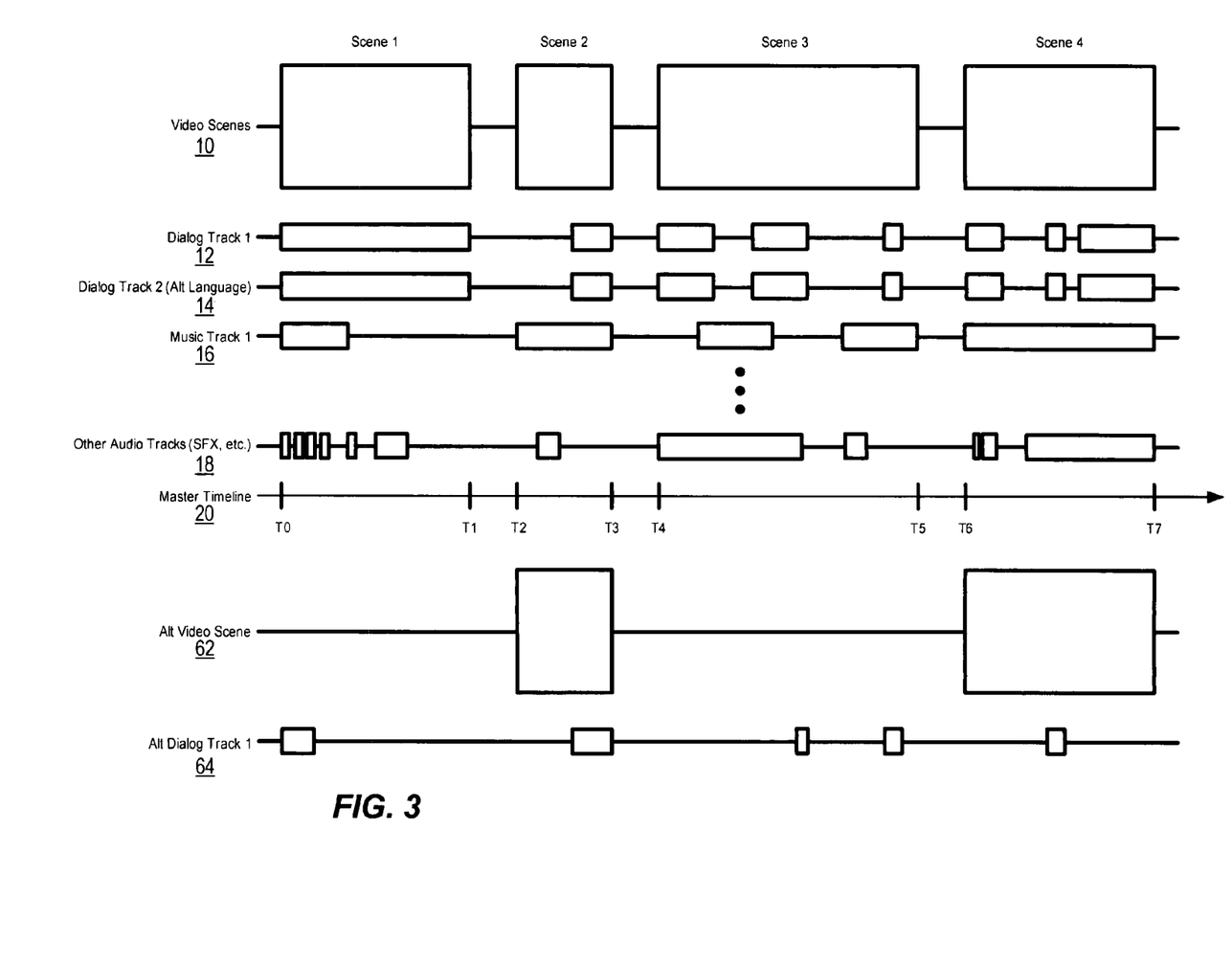
FIG. 3 shows a nonlinear editing system modified to support synchronization and delivery of alternative video and audio content in a manner consistent with certain embodiments of the present invention.

Now consider a content authoring process that supports dynamic content substitution. In order to support dynamic content substitution on a scene-by-scene basis, the authoring process described earlier must be substantially modified to allow concurrent editing of a second or alternate video track and additional audio tracks corresponding to scene substitutions (in contrast to a simple alternative audio track that runs the full length of the content. An example of such content with alternative audio and video is shown in FIG. 3 with the original track and master timeline relationships as shown in FIG. 1. In FIG. 3, the alternate video track 62 and alternate dialog track 64 are subordinate to the primary video track 10 and dialog track 12 and are temporally synchronized with the master timeline. However, since they represent alternate scenes and/or dialog, the alternative content does not have the benefit of continuously following the original time line.

After post-processing, both video tracks 12 and 64 are carried in the final content using the techniques to be described later. The nonlinear editor can be extended in accordance with the present teachings to accommodate the additional tracks for alternate video and audio, and is complimentary to the editing paradigm established for conventional linear editing tools.

One departure from the conventional process is the handling of the content comprising the final product or "cut". As described earlier, the final cut is assembled, mixed (audio) and streamed to compression equipment (encoders). A conventional video encoder can only accept a single, continuous video stream. The primary video stream meets that criterion. The alternate video stream can be characterized as a non-continuous (staccato) sequence of video to be transmitted or played concurrently with the primary video so that the receiving devices may elect whether or not to substitute the alternate versions for the primary. In the example content shown in FIG. 3, for example, alternate scenes are provided for Scene 2 and Scene 4, but not Scene 1 and Scene 3. Similarly, alternate dialog is provided for only portions of the dialog, as can be seen by comparing the example dialog tracks 12 and 64.

Figure 4:
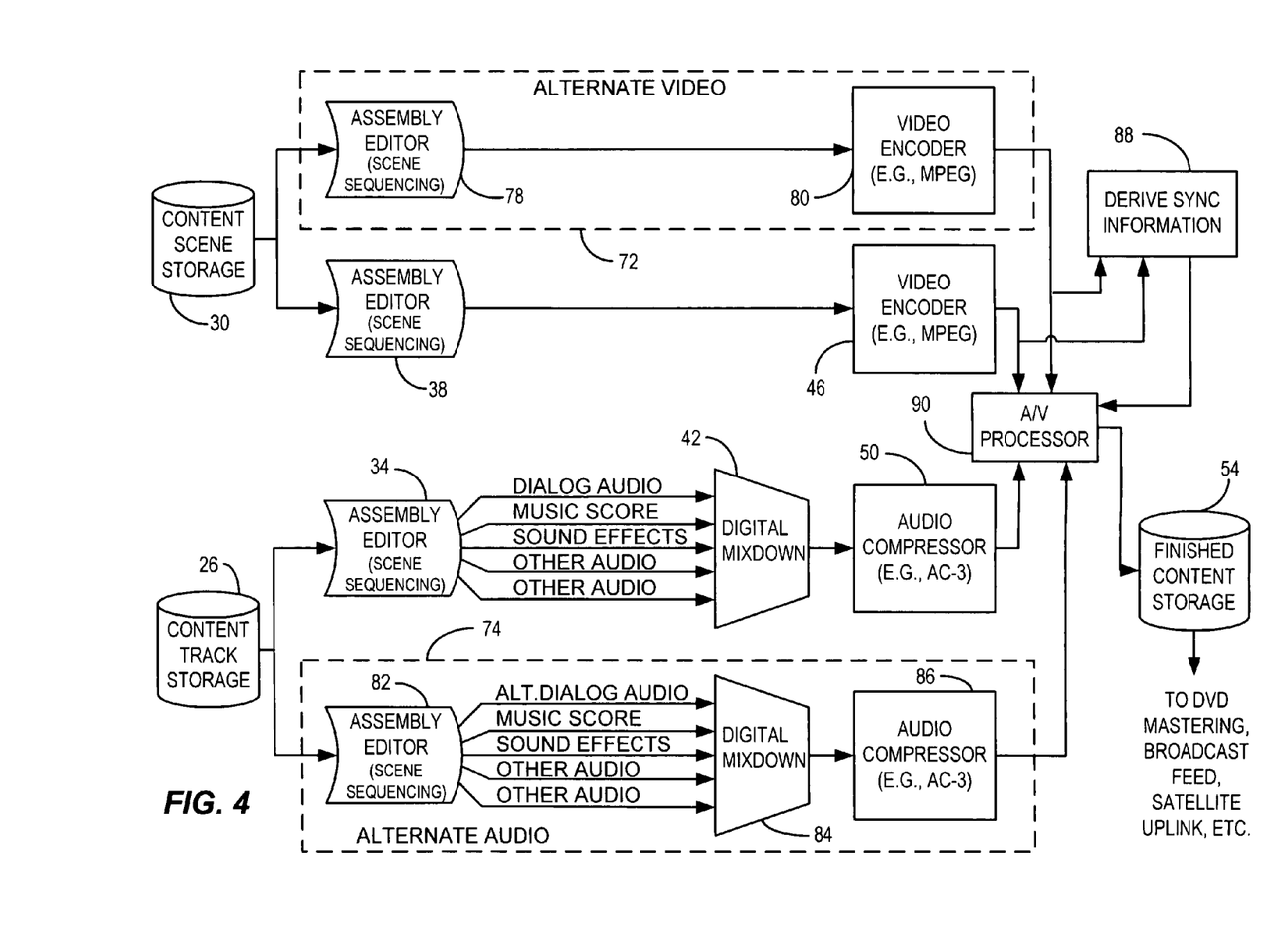
FIG. 4 shows post-edit content flow supporting dynamic content substitution consistent with certain embodiments of the present invention.

FIG. 4 shows an illustrative example of the post-edit content flow supporting dynamic content substitution consistent with certain embodiments of the present invention. In order to remain compatible with conventional video encoders, the nonlinear editing system fills periods between alternate video sequences (alternate scenes) with synthesized black screen in order to create a continuous video stream, which the encoder will accept, for purposes of the assembly of the final content. The encoding of primary and alternate video can occur using the same encoder so that the two processes occur serially, or can use multiple video encoders as shown to encode the two video streams in parallel. When processed serially, the editing system communicates with the encoder so that that synchronization information can be inserted, using any suitable protocol, by the encoder in both resultant compressed data streams for post-encoding reprocessing to combine the two video streams with proper synchronization.

As shown in FIG. 4, the process depicted in FIG. 2 is supplemented with an alternate video path 72 and an alternate audio path 74. The alternate video path 72 incorporates an additional scene sequencing in which the black screen is inserted at 78 and either a second video encoder 80 or a second sequential use of video encoder 46 (both of which are conceptualized by video encoder 80 in this depiction). During this encoding process for the alternate video, PIDs are utilized in a conventional manner to identify related video packets. In a similar manner, the alternate audio path 74 includes sequencing at 82 with the alternate dialog being mixed as appropriate with other audio tracks before digital mixdown at 84 and audio compression at 86. As with the video, the audio can either be separately processed in parallel at each stage using separate hardware, or in series using the same hardware as in the primary audio processing. During this encoding process for the alternate audio, PIDs are utilized in a conventional manner to identify related audio packets. Synchronization information is derived from the two video streams at 88.

Figure 5:
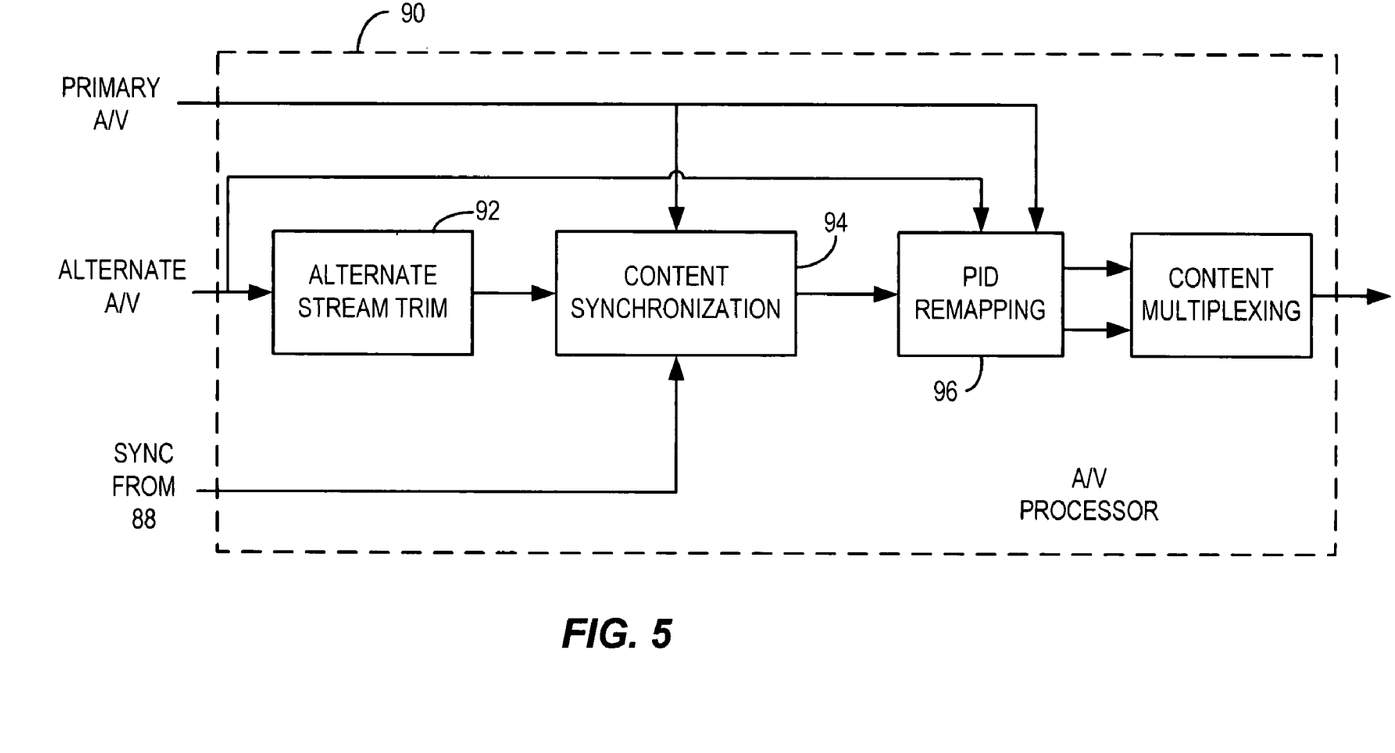
FIG. 5 is a diagram illustrating A/V processor operation in a manner consistent with certain embodiments of the present invention.

The two compressed audio outputs and the two compressed video outputs and the synchronization information are processed using a device referred to herein as an A/V processor 90, whose operation is depicted in connection with FIG. 5. The processed audio and video are stored as finished content at storage 54 as described previously.

The two compressed content multiplexes, original (primary) version and the second stream containing only the portions available for substitution, both with added synchronization marks, are inserted into a A/V processor. The operation of this processor 90 is shown in FIG. 5. The A/V processor 90 performs four major functions, alternate stream "trimming" at 92, content synchronization at 94, PID mapping at 96 and content remultiplexing at 98. These functions can be carried out using a programmed processor (or multiple programmed processors operating in concert) in certain embodiments.

The alternate content contains blank video (black screen) and muted audio between segments of alternate content. This is a byproduct of preparing the content for compression. The A/V processor 90 trims all black screen content and muted audio at 92 to allow the alternative content to be multiplexed into a primary transport stream in a manner similar to that described in connection with selective multiple encrypted content described in the applications above.

Next, at 94, the processor uses synchronization marks inserted by the encoders to allow the alternate content to be correctly located temporally within the primary transport stream so that primary audio and/or video content having alternate audio and/or video content can be contextually located in adjacent positions. That is to say, if the data are stored in packets, the primary audio or video and alternate audio or video are preferably situated in adjacent packets or nearby packets for ease of retrieval. This information is obtained from the synchronization information derived at 88 for the two video streams.

At 96, the PIDs for the audio and video streams may be remapped to provide PIDs which uniquely identify the primary and secondary audio and primary and secondary video. This provides individually identifiable packets of content that can be multiplexed together. At 98, the A/V processor 90 then merges the alternate content into the primary transport or program stream and provides signaling and formatting that enables suitably equipped playback devices to dynamically select any combination of primary/alternate content during broadcast or playback of the resultant composite content. As part of the merging process, the remultiplexer corrects Program Clock References (PCR) and other tasks normally encountered and associated with digital remultiplexing processes.

The composite, homogeneous output of the processor is then returned to the normal content process flow, where it is stored or forwarded to the distribution phase, either in mastering of package media, like DVD or to a broadcast source such as a video spooler for video on demand (VOD) or terrestrial broadcast & cable or uplink to satellite for Direct Broadcast Satellite service (DBS).

While the illustrative embodiment shown herein depicts providing a single set of alternate content, the process is readily incremented to provide several sets of alternate content using the same principles described.

Thus, in accordance with certain embodiments consistent with the present invention, a method providing alternate digital audio and video content in a segment of content containing compressed primary audio and encoded primary video involves inserting blank audio in an alternate audio track between segments of alternate audio; inserting black video in an alternate video track between segments of alternate video; synchronizing the alternate audio track to a master timeline; synchronizing the alternate video track to the master timeline; compressing the alternate audio track; compressing the alternate video track; trimming the blank audio from the compressed alternate audio track; trimming the black video from the compressed alternate video track; synchronizing the trimmed compressed alternate audio to locate the trimmed compressed alternate audio temporally with the primary compressed audio; synchronizing the trimmed compressed alternate video to locate the trimmed compressed alternate video temporally with the primary encoded video; and multiplexing the trimmed compressed alternate audio and the trimmed compressed alternate video with the primary compressed audio and the primary encoded video.

In certain embodiments, the primary audio and the alternate audio are compressed sequentially using a single audio compressor such as an AC-3, MPEG-1, AAC or DTS (by way of example). In other embodiments, the primary audio and the alternate audio are compressed using a primary and secondary audio compressor. In certain embodiments, the primary video and the alternate video are compressed using primary and alternate video encoders such as MPEG-2, AVC, VC-1 or MPEG-4, compliant video encoders (by way of example). In other embodiments, the primary video and the alternate video are encoded sequentially using a single video encoder. According to certain embodiments, a PID remapper maps the primary audio, the alternate audio, the primary video and the alternate video each to separate PID values. A computer readable storage medium can be used for storing instructions which, when executed on a programmed processor, carry out these processes.

In another embodiment, a video editor that provides alternate digital audio and video content in a segment of content containing compressed primary audio and encoded primary video has an audio sequencer that inserts blank audio in an alternate audio track between segments of alternate audio, wherein the alternate audio track is synchronized to a master timeline. A video sequencer inserts black video in an alternate video track between segments of alternate video, wherein the alternate video track is synchronized to the master timeline. A compressor compresses the alternate audio track and an encoder encodes and compresses the alternate video track. The blank audio is trimmed from the compressed alternate audio track and the black video is trimmed from the compressed alternate video track. A synchronizer is used to synchronize the trimmed compressed alternate audio to locate the trimmed compressed alternate audio temporally with the compressed primary audio. A synchronizer is also used for synchronizing the trimmed compressed alternate video to locate the trimmed compressed alternate video temporally with the encoded and compressed primary video. A multiplexer that multiplexes the trimmed compressed alternate audio and the trimmed compressed alternate video with the primary audio and the primary video.

Another video editor consistent with certain embodiments, provides alternate digital audio and video content in a segment of content containing primary audio and primary video has an audio sequencer that inserts blank audio in an alternate audio track between segments of alternate audio, wherein the alternate audio track is synchronized to a master timeline. A video sequencer inserts black video in an alternate video track between segments of alternate video, wherein the alternate video track is synchronized to the master timeline. A compressor mechanism for compressing the primary audio and alternate audio track. An encoder encodes and compresses the primary video and the alternate video track. The blank audio is trimmed from the compressed alternate audio track and the black video is trimmed from the compressed alternate video track. The compressed alternate audio is synchronized so that the trimmed compressed alternate audio can be temporally situated with the primary audio. The trimmed compressed alternate video is synchronized to locate the trimmed compressed alternate video temporally with the primary video. A multiplexer multiplexes the trimmed compressed alternate audio and the trimmed compressed alternate video with the compressed primary audio and the encoded and compressed primary video.

Other embodiments will occur to those skilled in the art in view of the above teachings.

Those skilled in the art will recognize, upon consideration of the above teachings, that certain of the above exemplary embodiments are or can be based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Similarly, certain embodiments herein were described in conjunction with specific circuitry that carries out the functions described, but other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Certain embodiments described herein, are or may be implemented using a programmed processor executing programming instructions that are broadly described above in process flow diagrams that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method providing alternate digital audio and video content in a segment of content containing compressed primary audio and encoded primary video, comprising:
   inserting blank audio in an alternate audio track between segments of alternate audio;
   inserting black video in an alternate video track between segments of alternate video;
   synchronizing the alternate audio track to a master timeline;
   synchronizing the alternate video track to the master timeline;
   compressing the alternate audio track;
   encoding the alternate video track;
   trimming the blank audio from the compressed alternate audio track;
   trimming the black video from the encoded alternate video track;
   synchronizing the trimmed compressed alternate audio to locate the trimmed compressed alternate audio temporally with the primary compressed audio;
   synchronizing the trimmed encoded alternate video to locate the trimmed encoded alternate video temporally with the primary encoded video; and
   multiplexing the trimmed compressed alternate audio and the trimmed encoded alternate video with the primary compressed audio and the primary encoded video.

2. The method according to claim 1, wherein the primary audio and the alternate audio are compressed using a single audio compressor.

3. The method according to claim 2, wherein the audio compressor is compliant with one of AC-3, AAC, DTS or MPEG-1.

4. The method according to claim 1, wherein the primary audio and the alternate audio are compressed using a primary and secondary audio compressors.

5. The method according to claim 4, wherein the audio compressors are compliant with one of AC-3, AAC, DTS or MPEG-1.

6. The method according to claim 1, wherein the primary video and the alternate video are encoded using primary and alternate video encoders.

7. The method according to claim 6, wherein the video encoders is compliant with one of MPEG-2, AVC, VC-1 or MPEG-4.

8. The method according to claim 1, wherein the primary video and the alternate video are encoded using a single video encoder.

9. The method according to claim 8, wherein the video encoder is compliant with one of MPEG-2, AVC, VC-1 or MPEG-4.

10. The method according to claim 1, wherein a Packet Identifier (PID) remapper maps the primary audio, the alternate audio, the primary video and the alternate video each to separate PID values.

11. A non-transitory computer readable storage medium storing instructions which, when executed on a programmed processor, carry out a process according to claim 1.

12. A video editor that provides alternate digital audio and video content in a segment of content containing compressed primary audio and encoded primary video, comprising:
- an audio sequencer that inserts blank audio in an alternate audio track between segments of alternate audio, wherein the alternate audio track is synchronized to a master timeline;
- a video sequencer that inserts black video in an alternate video track between segments of alternate video, wherein the alternate video track is synchronized to the master timeline;
- a compressor that compresses the alternate audio track;
- an encoder that encodes and compresses the alternate video track;
- means for trimming the blank audio from the compressed alternate audio track;
- means for trimming the black video from the encoded alternate video track;
- means for synchronizing the trimmed compressed alternate audio to locate the trimmed compressed alternate audio temporally with the compressed primary audio;
- means for synchronizing the trimmed encoded alternate video to locate the trimmed encoded alternate video temporally with the encoded primary video; and
- a multiplexer that multiplexes the trimmed compressed alternate audio and the trimmed compressed alternate video with the primary audio and the primary video.

13. The video editor according to claim 12, wherein the means for trimming the video and means for trimming the audio are implemented in an audio/video processor.

14. The video editor according to claim 13, wherein the means for synchronizing the video and the means for synchronizing the audio are implemented in the audio/video processor.

15. The video editor according to claim 13, wherein the multiplexer is implemented in the audio/video processor.

16. The video editor according to claim 12, wherein the primary and secondary audio compressors are compliant with one of AC-3, AAC, DTS or MPEG-1.

17. The video editor according to claim 12, wherein the primary and secondary video encoders are compliant with one of MPEG-2, AVC, VC-1, or MPEG-4.

18. The video editor according to claim 12, further comprising a Packet Identifier (PID) remapper that maps the primary audio, the alternate audio, the primary video and the alternate video each to separate PID values.

19. A video editor that provides alternate digital audio and video content in a segment of content containing primary audio and primary video, comprising:
- an audio sequencer that inserts blank audio in an alternate audio track between segments of alternate audio, wherein the alternate audio track is synchronized to a master timeline;
- a video sequencer that inserts black video in an alternate video track between segments of alternate video, wherein the alternate video track is synchronized to the master timeline;
- compressor means for compressing the primary audio and alternate audio track;
- encoder means for encoding and compressing the primary video and the alternate video track;
- means for trimming the blank audio from the compressed alternate audio track;
- means for trimming the black video from the encoded and compressed alternate video track;
- means for synchronizing the trimmed compressed alternate audio to locate the trimmed compressed alternate audio temporally with the primary audio;
- means for synchronizing the trimmed encoded compressed alternate video to locate the trimmed encoded compressed alternate video temporally with the primary video; and
- a multiplexer that multiplexes the trimmed compressed alternate audio and the trimmed encoded compressed alternate video with the compressed primary audio and the encoded and compressed primary video.

20. The video editor according to claim 19, wherein the means for trimming the video and means for trimming the audio are implemented in an audio/video processor.

21. The video editor according to claim 19, wherein the means for synchronizing the video and the means for synchronizing the audio are implemented in the audio/video processor.

22. The video editor according to claim 19, wherein the multiplexer is implemented in an audio/video processor.

23. The video editor according to claim 19, wherein the primary and secondary audio is compliant with one of AC-3, AAC, DTS or MPEG-1.

24. The video editor according to claim 19, wherein the primary and secondary video is compliant with one of MPEG-2, AVC, VC-1 or MPEG-4.

25. The video editor according to claim 19, further comprising a Packet Identifier (PID) remapper that maps the primary audio, the alternate audio, the primary video and the alternate video each to separate PID values.

26. The video editor according to claim 19, wherein the compressor means comprises a single audio compressor that sequentially encodes the primary and alternate audio.

27. The video editor according to claim 19, wherein the compressor means comprises a primary compressor that encodes the primary audio and an alternate compressor that compresses the alternate audio.

28. The video editor according to claim 19, wherein the encoding means comprises a single video encoder that sequentially encodes the primary video and the alternate video.

29. The video editor according to claim 19, wherein the encoding means comprises a primary video encoder and an alternate video encoder.

30. The video editor according to claim 19, wherein the encoding means comprises a single video encoder that sequentially encodes the primary and alternate video.

31. A video editor that provides alternate digital audio and video content in a segment of content containing primary audio and primary video, comprising:
- an audio sequencer that inserts blank audio in an alternate audio track between segments of alternate audio, wherein the alternate audio track is synchronized to a master timeline;
- a video sequencer that inserts black video in an alternate video track between segments of alternate video, wherein the alternate video track is synchronized to the master timeline;

compressor means comprising a primary audio compressor for compressing the primary audio, and an alternate audio compressor for compressing the alternate audio track;

encoder means for encoding and compressing the primary video and the alternate video track, wherein the encoder means comprises a primary video encoder and an alternate video encoder;

means for trimming the blank audio from the compressed alternate audio track;

means for trimming the black video from the encoded and compressed alternate video track;

means for synchronizing the trimmed compressed alternate audio to locate the trimmed compressed alternate audio temporally with the primary audio;

means for synchronizing the trimmed encoded and compressed alternate video to locate the trimmed encoded and compressed alternate video temporally with the encoded and compressed primary video;

a multiplexer that multiplexes the trimmed compressed alternate audio and the trimmed compressed alternate video with the compressed primary audio and the encoded and compressed primary video;

wherein the means for trimming the video and means for trimming the audio are implemented in an audio/video processor, and wherein the means for synchronizing the video and the means for synchronizing the audio are implemented in the audio/video processor, and wherein the multiplexer is implemented in an audio/video processor; and a Packet Identifier (PID) remapper that maps the primary audio, the alternate audio, the primary video and the alternate video each to separate PID values.

* * * * *